Patented Nov. 23, 1948

2,454,349

UNITED STATES PATENT OFFICE 2,454,349

PROCESS FOR TREATING AQUEOUS LIQUORS CONTAINING UNSATURATED ORGANIC COMPOUNDS FOR RECOVERING THE SAME

Arthur Schwerdle, New York, N. Y., assignor to Frank J. Sowa, New York, N. Y.

No Drawing. Application April 14, 1945,
Serial No. 588,424

5 Claims. (Cl. 260—514)

1

This invention relates in general to the treatment of waste liquors and their utilization in technically important processes and, in particular, to a process for treating the waste liquor resulting from the production of phthalic anhydride, and the recovery and separation of maleic acid from such waste liquor.

Many industrial chemical processes comprise as one step, the washing of the product with large quantities of water or the separation of the product from an aqueous medium or the scrubbing of industrial gases. In all such processes, it is frequently found that the waste liquors contain small quantities of valuable chemical substances in addition to commercially useless impurities. When the percentage of industrial chemicals present in the waste liquor is relatively low, it has heretofore been found that, in many cases, it was not commercially feasible to recover such chemicals because (a) the recovery and purification treatments occasionally necessitated the shipment of the waste liquors a considerable distance from the point of origin, resulting in high freight costs, and (b) the recovery frequently involved time-consuming dialysis, distillation or evaporation of large quantities of water. Moreover, such operations as distillation and evaporation frequently cause undesirable chemical changes in the products whose recovery is desired. For example, on heating the waste liquor containing maleic acid a substantial amount of the acid is converted into the less desirable and hard-to-purify fumaric acid. Therefore, it has frequently been customary to discard the waste liquor with a resulting loss of the valuable chemicals contained therein.

An excellent example of this common industrial practice is the process of producing phthalic anhydride by oxidation of aromatic hydrocarbons. As a last step in this process, the gases or vapors from the oxidation chamber are scrubbed with a large quantity of water. A typical waste liquor resulting from this washing was found to contain up to 16% by weight of maleic acid, 5% of phthalic acid and less than 1% of other organic acids and impurities. Despite the high content of maleic acid, it has not been deemed commercially feasible heretofore to attempt to recover this material from the aqueous liquor. This is so, despite the fact that maleic acid has numerous industrial uses.

Accordingly, it is apparent that if the maleic acid could be recovered in an inexpensive and rapid manner from the waste liquors resulting from production of phthalic anhydride, important savings could be accomplished and the uses of maleic acid extended.

2

The surprising discovery has now been made that the maleic acid need not be separated from the aqueous waste liquor above mentioned in order to be utilized in condensation reactions, and, on the contrary, that the maleic acid will react and condense with conjugated dienes without concentration or distillation of the liquor.

Accordingly, the process of the present invention comprises bringing an aqueous waste liquor containing maleic acid into contact with a conjugated diene selected from the group consisting of aliphatic, alicyclic and oxygen-heterocyclic dienes preferably with agitation to effect intimate admixture of the diene with the waste liquor, whereupon the maleic acid condenses with the diene to form insoluble alicyclic acids according to the following type reactions:

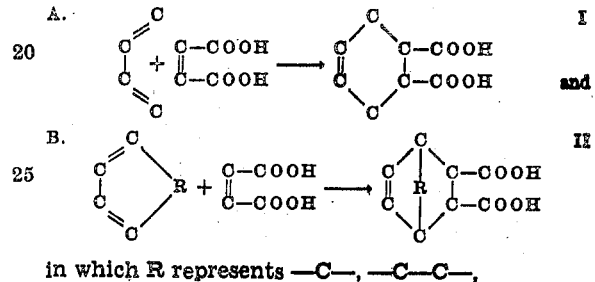

in which R represents —C—, —C—C—,

and —O—. In general, the other carbon atoms in the ring are normally united to hydrogen but they may be united to halogen, hydroxyl or another carboxyl group, or other ring substituents as desired. It is to be understood that the acids I and II thus produced are alicyclic because they contain only one double bond and the other ring carbons are saturated as indicated. The alicyclic acids, being insoluble in water, may be readily separated from the reaction mixture by settlement and decantation, filtration, screening or other conventional procedures. It has been found that as soon as an intimate mixture of the diene with the aqueous liquor has been effected, the reaction is exothermic and proceeds readily to completion, thus effectively removing substantially all of the maleic acid from the waste liquor.

The alicyclic acid I is, of course, obtained when the diene is aliphatic and the acid designated II is produced when the diene used is cyclic. The acids thus obtained may be used per se or converted into the corresponding anhydrides, mono-acid esters, and di-esters, or converted by thermal decomposition back into maleic acid for use in the chemical and industrial arts.

The present invention is not limited to the treatment of aqueous waste liquors containing maleic acid, but the invention contemplates the treatment, with the conjugated 1,3 dienes of the class described, of any aqueous liquor (including aqueous alcoholic liquors) containing any 1,2 unsaturated organic compound as a class, including dicarboxylic acids as a class such, for example, as maleic, citraconic, mesaconic acids and the like, and their halogen derivatives; also acrolein, water-soluble esters of acrylic acid, acrylic acid, and the like. However, by way of illustration but not by way of limiting the invention, the process will be described in connection with the treatment of aqueous waste liquors containing low concentrations of maleic acid, in particular, the liquor resulting from the production of phthalic anhydride by oxidation.

For the conjugated diene there may be used in the process the conjugated alicyclic (homocyclic) dienes as a class such, for example, as cyclopentadiene 1,3; 1,1,2,-trimethyl cyclopentadiene-1,3; cyclohexadiene-1,3; 1,3,5,5-tetramethyl cyclohexadiene-1,3 and the like; also oxygen-heterocyclic 1,3, dienes as a class such, for example, as furan, furoic acid, cumalin, 2-methyl cumalin, sylvan (2-methyl furan) and the like; also aliphatic dienes as a class such, for example, as butadiene, isoprene, cyclohexadiene 1,3, alpha phellandrene and the like. The diene does not have to be in the pure state but may be present in organic or inorganic mixtures or organic liquids and may itself be a waste material. The surprising discovery has now been made that, although the conjugated dienes are organic substances which are, in general, immiscible with water, they will react with the unsaturated compounds in the aqueous waste liquor. The reaction is facilitated by agitation, stirring or other intimate admixture, although in some cases a sufficient reaction occurs by merely bubbling the diene through the aqueous liquor. By placing the mixture under pressures greater than atmospheric, for example, up to 5 atmospheres, the reaction is facilitated, and elevated temperatures up to the boiling point of the waste liquor are effective in initiating the reaction but are not essential. In general, the diene is used in a mole equivalent of the unsaturated compound in the aqueous medium, but preferably the diene is used in a slight excess of the theoretical amount.

The mixing of the diene with the aqueous liquor is facilitated by the presence of a small amount, e. g. from 0.1 to 5% of a wetting agent in the reaction mixture. It is of advantage to add a surface tension depressant to the aqueous liquor before bringing the diene into contact therewith. Suitable agents are, for example, sulfonated fatty acids, sulfated fatty alcohols, e. g. "Tergitol," ethylene oxide condensates of higher alcohols, e. g. "Emulfor-O," Turkey red oil and the like.

When the product recovered is to be used in foods, or pharmaceuticals, the aqueous waste liquor or the resulting product may be decolorized and/or deodorized by contacting it with an absorbent such, for example, as carbon black, silica gel or the like and then filtering. It is often not necessary to purify the alicyclic acids resulting from the treatment of maleic acid-containing liquors with the diene because the resulting acid separates in such high purity that the melting point is identical with that given in the literature.

As an alternative, the conjugated water-immiscible diene may be first emulsified with a small quantity, e. g. from 2-20 times the weight of the diene of water (using a part of the waste liquor if desired). The emulsion is then added to the body of the waste liquor to obtain an intimate mixing. Suitable emulsifying agents are, for example, soluble soaps, methyl cellulose, glue, gelatine and the like which may be used with wetting agents.

When the reaction of the diene with the unsaturated maleic acid is complete, the alicyclic acid being insoluble in the waste liquor, precipitates and may be recovered by conventional means such, for example, as by running the reaction mixture into a settling tank and decanting the waste liquor, or by screening or filtering the mixture. The aqueous liquor resulting from the separation process may be discarded or further treated to recover other ingredients present therein.

It is apparent that the invention is capable of a number of variations of which the following may be given as illustrative but not as limiting the invention:

1. Instead of utilizing the waste liquor for the recovery of the maleic acid, the waste liquor containing acid may itself be used for purifying mixtures of gases or organic liquids containing a conjugated 1,3 diene selected from the group consisting of aliphatic, alicyclic and oxygen-heterocyclic dienes by scrubbing the gas or organic liquid with the waste liquor containing the maleic acid.

2. The diene may itself be present in a waste liquor in which case the waste liquor containing the diene is brought into contact with the waste liquid containing an unsaturated compound, e. g. the maleic acid, thus obtaining a valuable product.

By way of further illustrating the invention but not by way of limiting the same, there will be given the following specific examples:

*Example I*

One kilo of aqueous waste liquor resulting from the production of phthalic anhydride by oxidation and containing 16% of maleic acid, 5% of phthalic acid, .38% other organic acids, .4% sulfuric acid and .24% impurities, is mixed with 100 grams of cyclopentadiene and the mixture vigorously agitated for 15 minutes. During this period the temperature of the mixture rises from room temperature to about 50° C. and at the end of the period, a voluminous crystalline precipitate forms which is 3,6 endomethylene tetrahydrophthalic acid. The acid is light tan in color and may be readily filtered off with less than 10% moisture content. The melting point was determined to be 180° C. which is identical with that given in the literature for the pure acid. The yield was practically quantitative even when the acid is crystallized out of the liquor at 50° C.

*Example II*

The process of Example I is repeated but instead of cyclopentadiene there is used a mole equivalent of cyclohexadiene 1,3.

*Example III*

One mole of butadiene and a quantity of the aqueous waste liquor of Example I sufficient to contain one mole of maleic acid was mixed together and placed in an autoclave. The temperature is raised to 100° C. and the mixture in the autoclave vigorously agitated; after 10 or 15 minutes a precipitate of tetrahydrophthalic acid is produced almost in theoretical yield.

Example IV

Example I is repeated but .5% "Emulfor-O" wetting agent is added to the waste liquor before it is mixed with the diene.

Example V

Monocyclopentadiene is normally produced by thermal decomposition of dicyclopentadiene. This thermal decomposition step is utilized in the present example by adding to an autoclave containing one mole of dicyclopentadiene at least two moles of maleic acid in the form of the waste liquor described in Example I. The autoclave is closed and heated to 50 lbs. of steam pressure. The dicyclopentadiene breaks down into two moles of cyclopentadiene which immediately react with the maleic acid in the waste liquor to give endomethylene tetrahydrophthalic acid. The yield is practically theoretical. It is to be understood that higher polymers of cyclopentadiene may be reacted with the waste liquor in a similar manner.

The production of the alicyclic acids according to the treatment of waste liquors by the present invention is superior to the production of the same acid by condensing the pure dienes with organic solvent solutions of maleic acid because in the latter case the yield is not quantitative or theoretical since many side reactions take place. Moreover, in carrying out such condensations in organic media, the temperature of the reaction must be carefully controlled, otherwise the alicyclic acid produced tends to be decomposed and an equilibrium is established which cuts down the yield. Moreover, the present process provides the means for utilizing waste industrial liquors which have heretofore been discarded as commercially useless.

The term "waste liquor" includes by-product liquors and end-product liquors that are generally discarded because of low commercial value.

I claim:

1. In a process for the treatment of aqueous waste liquors containing maleic acid for the recovery of the maleic acid therefrom, the steps comprising bringing said aqueous waste liquor into contact with a conjugated diene selected from the group consisting of aliphatic, alicyclic and oxygenheterocyclic dienes, agitating said mixture, whereupon said diene condenses with the maleic acid in said waste liquor with the production of a water-insoluble alicyclic dicarboxylic acid and separating said acid from said waste liquor, said diene being used in an amount at least equal to the mole equivalent of said maleic acid.

2. In a process for the treatment of aqueous waste liquors containing maleic acid for the recovery of the maleic acid therefrom, mixing at least one mole of cyclopentadiene with a quantity of said aqueous waste liquor containing one mole of maleic acid, agitating said mixture until a voluminous crystalline precipitate forms and filtering said precipitate out of the reaction mixture, said precipitate comprising an endomethylene tetrahydrophthalic acid.

3. A process as claimed in claim 1 in which the mixing is carried out in the presence of a wetting agent.

4. A process as claimed in claim 1 in which the diene is first emulsified in water to form an emulsion before the diene is brought into contact with the waste liquor.

5. In a process for the treatment of aqueous waste liquors containing maleic acid for the recovery of the maleic acid therefrom, steps comprising mixing dicyclopentadiene with a quantity of aqueous waste liquor containing two moles of maleic acid, heating said mixture under pressure sufficient to cause thermal decomposition of the dicyclopentadiene into monocyclopentadiene, said monocyclopentadiene reacting with said maleic acid to give a water-insoluble endomethylene tetrahydrophthalic acid and separating said insoluble acid from the reaction mixture.

ARTHUR SCHWERDLE.

REFERENCES CITED

The following references are of record in the file of this patent:

UNITED STATES PATENTS

| Number | Name | Date |
| --- | --- | --- |
| 1,944,731 | Diels et al. | Jan. 23, 1934 |
| 2,104,956 | Stern et al. | Jan. 11, 1938 |
| 2,262,002 | Hopff et al. | Nov. 11, 1941 |

OTHER REFERENCES

Karrer, "Organic Chemistry" (1938), page 55.